United States Patent Office 3,519,023
Patented July 7, 1970

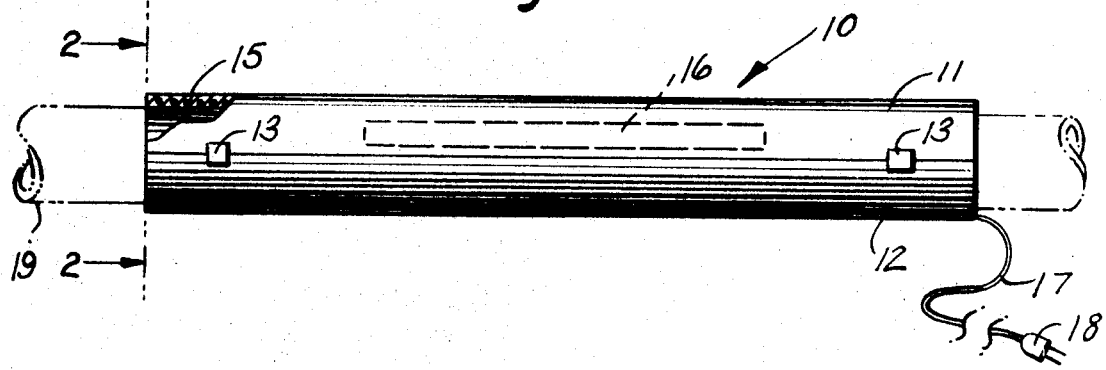
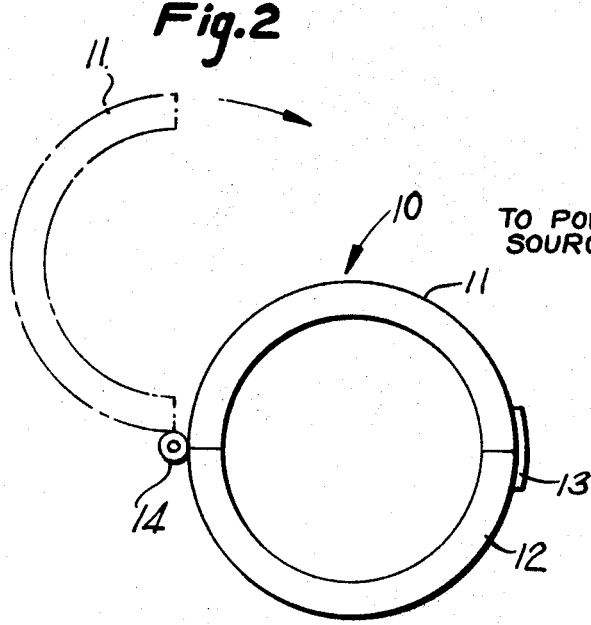
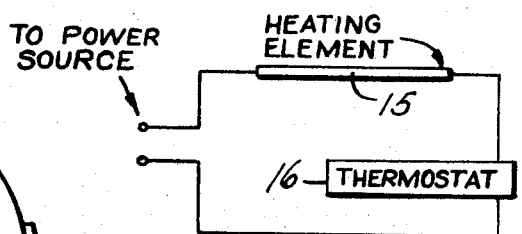
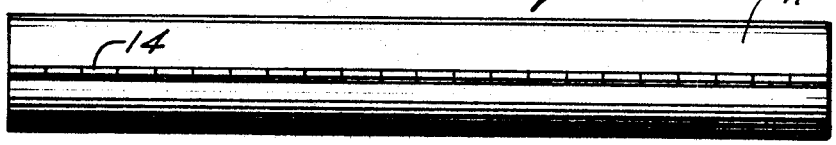

1

3,519,023
DEFROSTING COLLAR FOR PIPES
Ora W. Burns, Sr., 1335 Trendley Ave., East St. Louis,
Ill. 62201, and Richmond R. Simmons, 5315 Cabanne
Ave., Apt. 2, St. Louis, Mo. 63112
Filed Aug. 5, 1968, Ser. No. 750,176
Int. Cl. E03b 7/12; H05b 3/58
U.S. Cl. 138—33                2 Claims

ABSTRACT OF THE DISCLOSURE

A device for encasing an area of a frozen pipe, the device having a heating element which is connected to a power source and provides sufficient heat to defrost the pipe. This device is placed over the pipe and held in place by the tension of an internal spring and the device will be made in various sizes to accommodate various sizes of pipes.

---

This invention relates to heating devices and more particularly to a heating element contained collar for pipes.

It is therefore the main purpose of this invention to provide a defrosting collar for pipes which will be snapped over the pipe and held in place by the tension of an internal spring in order that the heat emitted by the heating element will defrost the pipe.

A further object of this invention is to provide a defrosting collar for defrosting pipes which will have a thermostat for controlling the amount of heat that will be applied to the pipe in order to defrost it.

Yet another object of this invention is to provide a defrosting collar which may be made in different lengths to one on top of the other, thus eliminating multiple cords.

Other objects of this invention are to provide a defrosting collar which is simple in design, inexpensive to manufacture, rugged in construction, easy to use and efficient in operation.

These and other objects will become readily apparent upon a study of the following specifications together with the accompanying drawing wherein:

FIG. 1 is a side view of the present invention shown in elevation and partly broken away; with the pipe shown in phantom line;

FIG. 2 is an enlarged end view of FIG. 1 showing the open position of the device in phantom lines;

FIG. 3 is a rear view of FIG. 1; and

FIG. 4 is a schematic wiring diagram of the invention.

According to this invention, a defrosting collar 10 is provided with a semi-circular half 11 and a semi-circular half 12 having snap fasteners 13 which will keep them closed. An elongated hinge 14 is connected to halves 11 and 12 and allow for them to be opened. Within defrosting collar 10 is molded a heating element 15 which is in series with a thermostat 16 and collar 10 is provided with an electric cord 17 and its associated plug 18 for plugging collar 10 into an electrical outlet (not shown).

In order to accommodate a section of pipe 19, halves 11 and 12 are opened, after which collar 10 is placed on pipe 19 and when cord 18 is plugged into an electrical outlet, the heating element 15 will produce heat of sufficient intensity to defrost pipe 19.

2

It will be noted that thermostat 16 allows the heating element 15 to maintain a constant temperature.

It will be noted further that thermostat 16 is adaptable to control the desired temperature of pipe 19 to thaw the liquid within pipe 19 and collar 10 is flexible in order that it may be used at different localities.

What we now claim is:
1. A defrosting collar for frozen pipes comprising a pair of elongated and semi-circular halves, a heating element carried by said halves providing a means of producing heat to be transferred to said pipe, means carried by said collar providing connection means for said halves and means carried by said halves providing a means for keeping said halves closed, the semi-circular halves being of uniform outward appearance and having relatively thin walls capable of being manufactured in standard length sections of standard tubing, each of the halves having a semi-circular inner tube and a semi-circular outer tube and walls connecting adjacent longitudinal edges of the inner and outer tubes to form a relatively thin, double wall, semi-circular pipe of constant cross-section, the heating element comprising an electrical heating element carried within the space between the inner and outer walls of each of the halves, the connection means for said halves comprising a single hinge extending the full length of the collar section hinging the halves together on one side of the collar section allowing for said halves to be opened but not completely separated from each other in order that the collar may encase and engage the outer periphery of the frozen pipe, the means for keeping the halves closed comprising snap fasteners opposite the hinged side of the collar section which automatically engage to hold the halves together when the halves are pressed into engagement with the frozen pipe, means connecting the electrical heating element of the end collar section to an electrical power source, and means electrically parallel connecting each of the other collar sections to an adjacent collar section forming a continuous electrically heated collar of any desired length.

2. The combination of claim 1 plus a thermostat, said heating element of said end collar section being series wired with said thermostat, said thermostat providing means of controlling the temperature produced by said collar in order to adapt the desired temperature of the pipe and liquid contained within said frozen pipe.

References Cited

UNITED STATES PATENTS

| | | | |
|---|---|---|---|
| 1,316,190 | 9/1919 | Sacherman | 219—535 X |
| 1,416,750 | 5/1922 | Popin | 219—535 X |
| 1,971,387 | 8/1934 | Scoville | 219—535 X |
| 2,452,367 | 10/1948 | Gangloff | 219—535 X |
| 2,572,695 | 10/1951 | Briscoe et al. | 219—535 |
| 2,718,585 | 9/1955 | Hariu | 219—535 X |
| 3,393,297 | 7/1968 | Hart | 219—535 X |

FOREIGN PATENTS 208,911    5/1940   Switzerland.

VOLODYMYR Y. MAYEWSKY, Primary Examiner

U.S. Cl. X.R.

219—524, 535